(12) United States Patent
Wang et al.

(10) Patent No.: US 10,798,301 B2
(45) Date of Patent: Oct. 6, 2020

(54) PANORAMIC IMAGE MAPPING METHOD

(71) Applicant: PEKING UNIVERSITY SHENZHEN GRADUATE SCHOOL, Shenzhen (CN)

(72) Inventors: Ronggang Wang, Shenzhen (CN); Yueming Wang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

(*) Notice: Subject to any disclaimer, the term of this patent is extended or adjusted under 35 U.S.C. 154(b) by 0 days.

(21) Appl. No.: 16/490,373

(22) PCT Filed: Aug. 22, 2017

(86) PCT No.: PCT/CN2017/098378
§ 371 (c)(1),
(2) Date: Nov. 21, 2019

(87) PCT Pub. No.: WO2018/157568
PCT Pub. Date: Sep. 7, 2018

(65) Prior Publication Data
US 2020/0092471 A1 Mar. 19, 2020

(30) Foreign Application Priority Data
Mar. 1, 2017 (CN) .......................... 2017 1 0116888

(51) Int. Cl.
*H04N 7/00* (2011.01)
*H04N 5/232* (2006.01)
(Continued)

(52) U.S. Cl.
CPC ....... *H04N 5/23238* (2013.01); *H04N 19/182* (2014.11); *H04N 19/597* (2014.11)

(58) Field of Classification Search
CPC ..... H04N 5/232; H04N 19/597; H04N 19/182
(Continued)

(56) References Cited

U.S. PATENT DOCUMENTS

2016/0286128 A1* 9/2016 Zhou ................. H04N 5/23248

FOREIGN PATENT DOCUMENTS

CN 103077509 A 5/2013
CN 105898344 A 8/2016
(Continued)

*Primary Examiner* — Robert Chevalier
(74) *Attorney, Agent, or Firm* — Miles & Stockbridge P.C.

(57) ABSTRACT

Disclosed is a panoramic image mapping method and a corresponding reversely mapping method. Particularly, the mapping process includes mapping a panoramic image or a spherical surface corresponding to Video A: first, dividing the spherical surface into three areas based on the latitudes of the spherical surface, denoted as Area I, Area II, and Area III, respectively; mapping the three areas to a square plane I', a rectangular plane II', and a square plane III', respectively; then, splicing the planes I', II' and III' into a plane, wherein the resulting plane is the two-dimensional image or video B. Compared with the equirectangular mapping method, the method according to the present disclosure may effectively ameliorate oversampling in high-latitude areas and effectively lower the bit rate needed by coding and the complexity of decoding. The present disclosure relates to the field of virtual reality, which may be applied to panoramic images and videos.

12 Claims, 1 Drawing Sheet

(51) Int. Cl.
*H04N 19/182* (2014.01)
*H04N 19/597* (2014.01)
*H04N 13/00* (2018.01)

(58) Field of Classification Search
USPC .......................... 348/36, 39, 42, 46, 49, 51
See application file for complete search history.

(56) References Cited

FOREIGN PATENT DOCUMENTS

| | | |
|---|---|---|
| CN | 106231311 A | 12/2016 |
| CN | 106412554 A | 2/2017 |
| CN | 106899840 A | 6/2017 |

\* cited by examiner

PANORAMIC IMAGE MAPPING METHOD

FIELD

The present disclosure relates to the field of virtual reality (VR), and more specifically relates to a novel panoramic image mapping method capable of reducing the bit rate needed for coding a panoramic image or video, which may be applied to panoramic images and videos.

BACKGROUND

With constant growth of virtual reality (VR) technologies, various fields have an increasing demand on VR videos. Compared with a traditional planar image, a 360° panoramic image requires a wider angle of view (AOV) and thus a higher resolution, and accordingly a higher bit rate.

Conventional coding and storing technologies do not support spherical surfaces; therefore, to code and store a panoramic image using existing methods, the 360° panoramic image needs to be mapped onto a two-dimensional plane. The most common mapping approach in conventional methods is equirectangular mapping, which includes sampling a spherical surface based on longitudes and latitudes of the spherical surface and mapping the spherical surface onto a two-dimensional plane. However, when mapping a 360° panoramic image with this approach, a relatively serious oversampling phenomenon occurs to high-latitude areas of the sphere, which is highly demanding on the bit rate coding and increases the complexity of decoding.

SUMMARY

Embodiments of the present disclosure provide a novel panoramic image mapping method and a corresponding reversely mapping method, wherein the panoramic image mapping method may map a spherical surface onto a two-dimensional plane and the panoramic reversely mapping method may map the plane back to the spherical surface for being rendered and viewed. The methods effectively ameliorate the oversampling of the spherical surface corresponding to the panoramic image or video in high-latitude areas, reduce the bit rate for coding the panoramic image and video, and meanwhile improve coding efficiency.

A technical solution of the present disclosure is provided below:

A panoramic image mapping method, which maps a spherical surface corresponding to panoramic image or video A onto two-dimensional plane image or video B so as to ameliorate the oversampling of the panoramic image in high-latitude areas and reduce the bit rate required for coding the panoramic image and video; to map a spherical surface to a two-dimensional plane, the mapping method includes: first partitioning the spherical surface into three areas based on the latitudes of the spherical surface, denoted as Area I, Area II, and Area III, respectively, wherein Area I corresponds to the area with a latitude of $-90°\sim Z_1$ on the spherical surface, Area II corresponds to the area with a latitude of $Z_1\sim Z_2$ on the spherical surface, and Area III corresponds to the area with a latitude of $Z_2\sim 90°$ on the spherical surface; then, mapping Area I into a square plane $W_I \times W_I$ with a resolution of I', mapping Area II to a rectangular plane II' with a resolution of $W_{II} \times H_{II}$, and mapping Area III into a square plane III' with a resolution of $W_{III} \times W_{III}$; finally, splicing the planes I', II', III' into a plane based on the values of $W_I$, $W_{II}$, $H_{II}$, $W_{III}$, wherein the spliced plane is the two-dimensional plane image B; the parameters $Z_1$, $Z_2$, $W_I$, $W_{II}$, $H_{II}$, $W_{III}$ may all be set and have to satisfy the conditions of $-90°\leq Z_1 \leq Z_2$ and $Z_1 \leq Z_2 \leq 90°$.

In the panoramic image mapping method, further, the process of mapping the spherical surface corresponding to the panoramic image or video A to the two-dimensional plane image or video B includes the following steps or equivalent implementations of the following steps:

1) for each pixel point in the square plane I', computing its corresponding spherical coordinates (longitudes and latitudes) based on its coordinates (X, Y) in the plane I'; then, taking the pixel value at a corresponding position on the spherical surface (or obtaining a corresponding pixel value of a surrounding pixel by interpolation) as the pixel value of the pixel point (X, Y) in the plane I'. The computing the corresponding spherical surface Coordinate based on the coordinates (X, Y) in the plane I' includes steps of:

1.1) computing the vertical distance and the horizontal distance from the point to the square plane I', and taking the larger one, denoted as m;

1.2) the square plane I' may comprise a plurality of concentric squares; in this step, the distance from the point to the $0^{th}$ point on the concentric square where the point is located, denoted as n; wherein the position of the $n^{th}$ point may be randomly selected; the distance may be computed in a clockwise or counterclockwise manner;

1.3) computing the latitude and the longitude longitude corresponding to the point with coordinates (X, Y) in the square plane I' based on n and m;

2) for each pixel point in the rectangular plane II', computing its corresponding spherical coordinates (longitudes and latitudes) based on its coordinates (X, Y) in the plane II'; then, taking the pixel value at a corresponding position on the spherical surface (or obtaining a corresponding pixel value of a surrounding pixel by interpolation) as the pixel value of the pixel point (X, Y) in the plane II'. The equation of computing the corresponding spherical surface Coordinate based on the coordinates (X, Y) in the plane II' is:

$$\text{latitude} = Z_2 - (Z_2 - Z_1) \times (Y+0.5) \div H_{II}$$

$$\text{longitude} = 360° \times (X+0.5) \div W_{II} - 180° + \text{offset}$$

Where offset denotes the longitude corresponding to the center of the rectangular plane II', which may be autonomously set.

3) for each pixel point in the square plane III', computing its corresponding spherical coordinates (longitudes and latitudes) based on its coordinates (X, Y) in the plane III'; then, taking the pixel value at a corresponding position on the spherical surface (or obtaining a corresponding pixel value of a surrounding pixel by interpolation) as the pixel value of the pixel point (X, Y) in the plane I'. The computing the corresponding spherical surface Coordinate based on the coordinates (X, Y) in the plane I' includes the steps of:

3.1) computing the vertical distance and the horizontal distance from the point to the square plane III', and taking the larger one, denoted as m;

3.2) the square plane III' may comprise a plurality of concentric squares; in this step, the distance from the point to the $0^{th}$ point on the concentric square where the point is located, denoted as n; wherein the position of the nth point may be randomly selected;

3.3) computing the latitude and the longitude longitude corresponding to the point with coordinates (X, Y) in the square plane III' based on n and m;

4) splicing the planes I', II', and III' into a plane based on the value of $W_I$, $W_{II}$, $H_{II}$, $W_{III}$.

For the panoramic image mapping process, further, mapping formats of the panoramic image or video A include, but are not limited to, a longitude-latitude image, a cubic mapping image, a multi-channel camera acquired panoramic image or video.

For the panoramic image mapping method, further, the equation in step 1.1) of computing the vertical distance and the horizontal distance from the point to the square plane I', and taking the larger one, denoted as m, is provided below:

$$m = \max(\text{abs}(W_I \div 2 - X - 0.5), \text{abs}(W_I \div 2 - Y - 0.5))$$

For the panoramic image mapping method, further, in step 1.2), the method of computing a distance from the point to the $0^{th}$ point on the concentric square is provided below, wherein a pixel at a right upper corner is specifically selected as the 0 pixel, and the distance is computed in a counter-clockwise direction:

$$m2 = (W_I - 1) \div 2 - m$$

$$n = \begin{cases} X + 0.5 - m2 & (Y \leq X \text{ and } X + Y < W_{III}) \\ 2 \times m + Y + 0.5 - m2 & (Y < X \text{ and } X + Y \geq W_{III}) \\ 4 \times m + W_{III} - (X + 0.5) - m2 & (Y \geq X \text{ and } X + Y > W_{III}) \\ 6 \times m + W_{III} - (Y + 0.5) - m2 & (Y > X \text{ and } X + Y \leq W_{III}) \end{cases}$$

For the panoramic image mapping method, further, the equation in step 1.3) of computing the latitude and the longitude longitude corresponding to the point with coordinates (X, Y) in the square plane I' based on n and m, is provided below:

$$\text{latitude} = (Z_1 + 90°) \times m \div (W_I \div 2) - 90°$$

$$\text{longitude} = n \div (8 \times m) \times 360° - 180°$$

For the panoramic image mapping method, further, the equation in step 3.1) of computing the vertical distance and the horizontal distance from the point to the square plane III', and taking the larger one, denoted as m, is provided below:

$$m = \max(\text{abs}(W_{III} \div 2 - X - 0.5), \text{abs}(W_{III} \div 2 - Y - 0.5))$$

For the panoramic image mapping method, further, in step 3.2), the method of computing a distance from the point to the $0^{th}$ point on the concentric square is provided below, wherein a pixel at a right upper corner is specifically selected as the 0th pixel, and the distance is computed in a clockwise direction:

$$m2 = (W_{III} - 1) \div 2 - m$$

$$n = \begin{cases} Y + 0.5 - m2 & (Y \geq X \text{ and } X + Y < W_{III}) \\ 2 \times m + X + 0.5 - m2 & (Y > X \text{ and } X + Y \geq W_{III}) \\ 4 \times m + W_{III} - (Y + 0.5) - m2 & (Y \leq X \text{ and } X + Y > W_{III}) \\ 6 \times m + W_{III} - (X + 0.5) - m2 & (Y < X \text{ and } X + Y \leq W_{III}) \end{cases}$$

For the panoramic image mapping method, further, the equation in step 3.3) of computing the latitude and the longitude longitude corresponding to the point with coordinates (X, Y) in the square plane III' based on n and m, is provided below:

$$\text{latitude} = 90° - (90° - Z_2) \times m \div (W_{III} \div 2)$$

$$\text{longitude} = n \div (8 \times m) \times 360° - 180°$$

For the panoramic image mapping method, further, when $W_I = 0.25 \times W_{II} = H_{II} = W_{III}$, the splicing below may be performed in step 4): as $0.25 \times W_{II} = H_{II}$, the resolution of the rectangular plane II' is denoted as $4H_{II} \times H_{II}$; first, the rectangular plane II' is divided into four small planes with a resolution of $H_{II} \times H_{II}$, denoted as $II_1'$, $II_2'$, $II_3'$, and $II_4'$, respectively; then, splicing them into a plane with a resolution of $6W_I \times W_I$ based on the order of plane $II_1'$, plane $II_2'$, plane $II_3'$, plane III', plane $II_4'$, and plane I'; during the splicing process, the plane III' rotates 90° clockwise, and the plane $II_4'$ rotates 90° counterclockwise.

In another aspect, the panoramic image reversely mapping method refers to mapping a two-dimensional plane image or video B back to a spherical surface, wherein the two-dimensional plane image B is spliced by three planes, which are denoted as plane I', plane II', and plane III', respectively, wherein the plane I' is a square plane with a resolution of $W_I \times W_I$, the plane II' is a rectangular plane with a resolution of $W_{II} \times H_{II}$, and the plane III' is a square plane with a resolution of $W_{III} \times W_{III}$; the panoramic video reversely mapping method refers to mapping the plane I' back to Area I on the spherical surface with a latitude of $-90°\sim Z_1$, mapping the plane II' back to Area II on the spherical surface with a latitude of $Z_1 \sim Z_2$, and mapping the plane III' back to Area III on the spherical surface with a latitude of $Z_2 \sim 90°$, wherein the values of parameter $Z_1$, $Z_2$, $W_I$, $W_{II}$, $H_{II}$, $W_{III}$ are obtained from a bit stream, but not limited thereto.

In the panoramic image reversely mapping method, the process of mapping the two-dimensional plane image or video B back to the spherical surface includes the following steps or equivalent implementations of the following steps:

1) splitting the two-dimensional image B into plane I', plane II', and plane III';

2) for all pixels in the area on the spherical surface with a latitude of $-90°\sim Z_1$, computing its corresponding coordinates (X, Y) in the plane I' based on the spherical coordinates Coordinate (longitudes and latitudes), and taking the pixel value at (X, Y) in the plane I' (or interpolating a surrounding pixel) as the value of the pixel point on the spherical surface at the coordinates Coordinate. The step of computing its corresponding coordinates (X, Y) in the plane I' based on the spherical coordinates Coordinate is provided below:

2.1) computing, based on the latitude latitude, the distance m from the point in the plane I' corresponding to the point on the spherical surface to the center of the plane I';

2.2) computing, based on the longitude longitude, the distance n from the point in the plane I' corresponding to the point on the spherical surface to the $n^{th}$ point in the concentric square where the corresponding point is located;

2.3) computing the coordinates (X, Y) of the point in the plane I' corresponding to the point on the spherical surface;

3) for all pixels in the area on the spherical surface with a latitude of $Z_1 \sim Z_2$, computing its corresponding coordinates (X, Y) in the plane II' based on the spherical coordinates Coordinate (longitudes and latitudes), and taking the pixel value at (X, Y) in the plane II' (or interpolating a surrounding pixel) as the value of the pixel point on the spherical surface at the coordinates Coordinate. The equation of computing its corresponding coordinates (X, Y) in the plane II' based on the spherical coordinates Coordinate is provided below:

$$Y = (Z_2 - \text{latitude}) \times H_{II} \div (Z_2 - Z_1) - 0.5$$

$$X = (\text{longitude} + 180° - \text{offset}) \div 360° \times W_{II} - 0.5$$

where offset is the longitude corresponding to the center of the rectangular plane II'.

4) for all pixels in the area on the spherical surface with a latitude of $Z_2 \sim 90°$, computing its corresponding coordinates (X, Y) in the plane III' based on the spherical coordinates Coordinate (longitudes and latitudes), and taking the pixel value at (X, Y) in the plane III' (or interpolating a surrounding pixel) as the value of the pixel point on the spherical surface at the coordinates Coordinate.

4.1) computing, based on the latitude latitude, the distance m from the point in the plane III' corresponding to the point on the spherical surface to the center of the plane III';

4.2) computing, based on the longitude longitude, the distance n from the point in the plane III' corresponding to the point on the spherical surface to the $n^{th}$ point in the concentric square where the corresponding point is located;

4.3) computing, based on the values of m and n and the position of the $0^{th}$ pixel of the concentric square, the coordinates (X, Y) of the point in the plane III' corresponding to the point on the spherical surface.

For the panoramic image reversely mapping method, further, in step 1), in the case of the parameter $W_1=0.25 \times W_{II}=H_{II}=W_{III}$, and when the two-dimensional plane image B spliced by the plane I', the plane II', and the plane III' has a resolution of $6W_I \times W_I$, the two-dimensional plane image B may be split as follows: splitting the two-dimensional plane image B into 6 $W_I \times W_I$ planes, denoted as plane 1, plane 2, plane 3, plane 4, plane 5, and plane 4; rotating the plane 4 counterclockwise by 90° to obtain the plane III'; the plane 6 is the plane I'; the remained 4 planes are spliced in the order of plane 1, plane 2, plane 3, and plane 5 into a plane with a resolution of $4W_I \times W_I$ (wherein the plane 5 is rotated clockwise by 90°) to obtain the plane II'.

For the panoramic image reversely mapping method, further, the equation in step 2.1) of computing, based on the latitude latitude, the distance m from the point in the plane I' corresponding to the point on the spherical surface to the center of the plane I' is as follows:

$$m=(W_I \div 2) \times (\text{latitude}+90°) \div (Z_1+90°)$$

For the panoramic image reversely mapping method, further, the equation in step 2.2) of computing, based on the longitude longitude, the distance n from the point in the plane I' corresponding to the point on the spherical surface to the nth point in the concentric square where the corresponding point is located;

$$n=8 \times m \times (\text{longitude}+180°) \div 360°$$

For the panoramic image reversely mapping method, further in step 2.3), the pixel at the upper right corner is specifically selected as the 0th pixel based on the values of m and n, wherein the distance is computed counterclockwise, and the equation of computing the coordinates (X, Y) of the point in the plane I' corresponding to the point on the spherical surface is provided below:

$$m2 = (W_I - 1) \div 2 - m$$

$$\begin{cases} X = n + m2 - 0.5; Y = W_I \div 2 - m - 0.5 & (n < 2 \times m) \\ X = W_I \div 2 + m - 0.5; Y = n + m2 - 2 \times m - 0.5 & (2 \times m \le n < 4 \times m) \\ X = 4 \times m - n - m2 + W_I - 0.5; Y = W_I \div 2 + m - 0.5 & (4 \times m \le n < 6 \times m) \\ X = W_I \div 2 - m - 0.5; Y = 6 \times m - n - m2 + W_I - 0.5 & (6 \times m \le n \le 8 \times m) \end{cases}$$

For the panoramic image reversely mapping method, further, the equation in step 4.1) of computing, based on the latitude latitude, the distance m from the point in the plane III' corresponding to the point on the spherical surface to the center of the plane III' is as follows:

$$m=(W_{III} \div 2) \times (90° - \text{latitude}) \div (90° - Z_2)$$

For the panoramic image reversely mapping method, further, the equation in step 4.2) of computing, based on the longitude longitude, the distance n from the point in the plane III' corresponding to the point on the spherical surface to the $n^{th}$ point in the concentric square where the corresponding point is located;

$$n=8 \times m \times (\text{longitude}+180°) \div 360°$$

For the panoramic image reversely mapping method, further, in step 4.3), the pixel at the upper right corner is specifically selected as the $0^{th}$ pixel based on the values of m and n, wherein the distance is computed in a clockwise direction, and the equation of computing the coordinates (X, Y) of the point in the plane III' corresponding to the point in the spherical surface is provided below:

$$m2 = (W_{III} - 1) \div 2 - m$$

$$\begin{cases} Y = n + m2 - 0.5; X = W_{III} \div 2 - m - 0.5 & (n < 2 \times m) \\ Y = W_{III} \div 2 + m - 0.5; X = n + m2 - 2 \times m - 0.5 & (2 \times m \le n < 4 \times m) \\ Y = 4 \times m - n - m2 + W_{III} - 0.5; \\ \quad X = W_{III} \div 2 + m - 0.5 & (4 \times m \le n < 6 \times m) \\ Y = W_{III} \div 2 - m - 0.5; \\ \quad X = 6 \times m - n - m2 + W_{III} - 0.5 & (6 \times m \le n \le 8 \times m) \end{cases}$$

Compared with the prior art, the present disclosure has the following beneficial effects:

The present disclosure provides a novel panoramic image mapping method and a corresponding reversely mapping method. Particularly, the mapping process includes mapping a panoramic image or a spherical surface corresponding to Video A: first, dividing the spherical surface into three areas based on the latitudes of the spherical surface, denoted as Area I, Area II, and Area III, respectively; mapping the three areas to a square plane I', a rectangular plane II', and a square plane III', respectively; then, splicing the planes I', II' and III' into a plane, wherein the resulting plane is the two-dimensional image or video B.

The methods according to the present disclosure allow for autonomously setting the parameters to perform mapping and reversely mapping. Compared with the equirectangular mapping method, when the parameters are reasonably selected (e.g., $W_I=0.25 \times W_{II}=H_{II}, =W_{III}$), the method according to the present disclosure may effectively ameliorate oversampling in high-latitude areas and effectively lower the bit rate needed by coding and the complexity of decoding. In specific implementations, a spherical panoramic video is mapped into a plane view screen of a same size (i.e., having the same number of pixels) by using equirectangular, PLANE_POLES, and the present disclosure and encoded; compared with equirectangular mapping, the method according to the present disclosure achieves an improvement of over 10% coding efficiency; compared with the PLANE_POLEs method, the coding efficiency is enhanced by 3%~4%. The present disclosure may be applied to panoramic images and videos.

BRIEF DESCRIPTION OF THE DRAWINGS

where (a) is the spherical panoramic image before mapping; (b) is a schematic diagram of the square plane I', the rectangular plane II', and the square plane III' obtained after mapping according to the panoramic image mapping method of the present disclosure; (c) is the plane image obtained after splicing the mapped planes.

DETAILED DESCRIPTION OF EMBODIMENTS

Hereinafter, the present disclosure is further described through the embodiments, but the scope of the present disclosure is not limited in any manner.

Embodiments of the present disclosure provide a novel panoramic image mapping method and a corresponding reversely mapping method, wherein the panoramic image mapping method according to the present disclosure may map a spherical surface onto a two-dimensional plane, thereby ameliorating oversampling of the high-latitude area. The reversely mapping method may map the planar image in the present disclosure back to a sphere for being rendered and viewed.

An embodiment of the present disclosure provides a main viewpoint-based panoramic image mapping method, comprising a panoramic image mapping method and a corresponding reversely mapping method, embodiments of which will be explained below, respectively.

Figure 1:
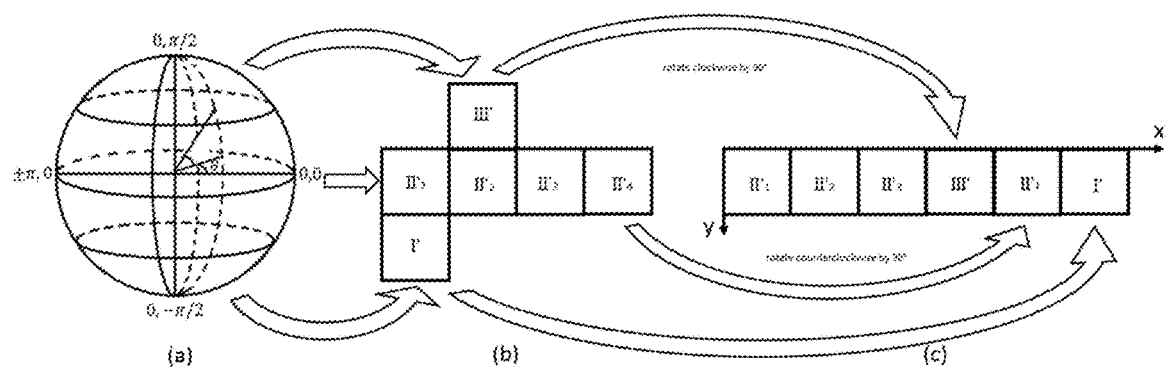
FIG. 1 is a schematic diagram of a mapping process in the panoramic image mapping method provided according to an embodiment of the present disclosure.

FIG. 1 shows a process of mapping a spherical surface corresponding to the panoramic image A to the two-dimensional plane image B using the panoramic image reversely mapping method. partitioning the spherical surface into three areas based on the latitudes of the spherical surface, denoted as Area I, Area II, and Area III, respectively, wherein Area I corresponds to the area with a latitude of $-90°\sim Z_1$ on the spherical surface, Area II corresponds to the area with a latitude of $Z_1\sim Z_2$ on the spherical surface, and Area III corresponds to the area with a latitude of $Z_2\sim 90°$ on the spherical surface; then, mapping Area I into a square plane I' a resolution of $W_I \times W_I$, mapping Area II to a rectangular plane II' with a resolution of $W_{II} \times H_{II}$, and mapping Area III into a square plane III' with a resolution of $W_{III} \times W_{III}$; finally, splicing the planes I', II', and III' into a plane based on the value of $W_I$, $W_{II}$, $H_{II}$, $W_{III}$, wherein the spliced plane is the two-dimensional plane image B; the parameters $Z_1$, $Z_2$, $W_I$, $W_{II}$, $H_{II}$, $W_{III}$ may all be set and have to satisfy the conditions of: $-90°\leq Z_1 \leq Z_2$ and $Z_1 \leq Z_2 \leq 90°$, in this embodiment, let the parameter $W_I=0.25\times W_{II}=H_{II}=W_{III}$ so as to guarantee that the planes may be finally spliced into a rectangular. The steps of the method of mapping the spherical surface in FIG. 1(a) into the plane in FIG. 1(c) include:

First step: for each pixel point in the square plane I', computing its corresponding spherical coordinates (longitudes and latitudes) based on its coordinates (X, Y) in the plane I'; then, taking the pixel value at a corresponding position on the spherical surface (or obtaining a corresponding pixel value of a surrounding pixel by interpolation) as the pixel value of the pixel point (X, Y) in the plane I'. The steps of computing the corresponding spherical surface Coordinate based on the coordinates (X, Y) in the plane I' including:

1.1) computing, through equation 1, the vertical distance and the horizontal distance from the point to the square plane I', and taking the larger one, denoted as m:

$$m=\max(\text{abs}(W_I \div 2-X-0.5), \text{abs}(W_I \div 2-Y-0.5)) \quad \text{(Equation 1)}$$

1.2) the square plane I' may comprise a plurality of concentric squares; in this step, the distance from the point to the $0^{th}$ point on the concentric square where the point is located, denoted as n; specifically, the pixel at the upper right corner is selected as the $0^{th}$ pixel, and the distance is computed in the counterclockwise direction; the computing method is provided below:

$$n = \begin{cases} X+0.5-m2 & (Y \leq X \text{ and } X+Y < W_{III}) \\ 2\times m+Y+0.5-m2 & (Y < X \text{ and } X+Y \geq W_{III}) \\ 4\times m+W_{III}-(X+0.5)-m2 & (Y \geq X \text{ and } X+Y > W_{III}) \\ 6\times m+W_{III}-(Y+0.5)-m2 & (Y > X \text{ and } X+Y \leq W_{III}) \end{cases} \quad \text{(Equation 2)}$$

where $m2=(W_I-1)\div 2-m$.

1.3) computing the latitude and the longitude longitude corresponding to the point with coordinates (X, Y) in the square plane I' based on n and m, through equation 3 and equation 4 below:

$$\text{latitude}=(Z_1+90°)\times m \div (W_I \div 2)-90° \quad \text{(equation 3)}$$

$$\text{longitude}=n \div (8 \times m) \times 360°-180° \quad \text{(equation 4)}$$

Second step: for each pixel point in the square plane II', computing its corresponding spherical coordinates (longitudes and latitudes) based on its coordinates (X, Y) in the plane II'; then, taking the pixel value at a corresponding position on the spherical surface (or obtaining a corresponding pixel value of a surrounding pixel by interpolation) as the pixel value of the pixel point (X, Y) in the plane II'. The equation of computing the corresponding spherical surface Coordinate based on the coordinates (X, Y) in the plane II' is:

$$\text{latitude}=Z_2-(Z_2-Z_1)\times(Y+0.5) \div H_{II} \quad \text{(Equation 5)}$$

$$\text{longitude}=360°\times(X+0.5) \div W_{II}-180°+\text{offset} \quad \text{(Equation 6)}$$

where offset denotes the longitude corresponding to the center of the rectangular plane II', which may be autonomously set.

Third Step: for each pixel point in the square plane III', computing its corresponding spherical coordinates (longitudes and latitudes) based on its coordinates (X, Y) in the plane III'; then, taking the pixel value at a corresponding position on the spherical surface (or obtaining a corresponding pixel value of a surrounding pixel by interpolation) as the pixel value of the pixel point (X, Y) in the plane III'. The method of computing the corresponding spherical surface Coordinate based on the coordinates (X, Y) in the plane III':

3.1) computing the vertical distance and the horizontal distance from the point to the square plane III', and taking the larger one, denoted as m;

$$m=\max(\text{abs}(W_{III} \div 2-X-0.5), \text{abs}(W_{III} \div 2-Y-0.5)) \quad \text{(Equation 7)}$$

3.2) the square plane III' may comprise a plurality of concentric squares; in this step, the distance from the point to the $0^{th}$ point on the concentric square where the point is located, denoted as n; wherein the position of the $n^{th}$ point may be randomly selected;

$$n = \begin{cases} Y + 0.5 - m2 & (Y \geq X \text{ and } X + Y < W_{III}) \\ 2 \times m + X + 0.5 - m2 & (Y > X \text{ and } X + Y \geq W_{III}) \\ 4 \times m + W_{III} - (Y + 0.5) - m2 & (Y \leq X \text{ and } X + Y > W_{III}) \\ 6 \times m + W_{III} - (X + 0.5) - m2 & (Y < X \text{ and } X + Y \leq W_{III}) \end{cases}$$ (Equation 8)

where $m2=(W_{III}-1) \div 2 - m$.

3.3) computing the latitude and the longitude longitude corresponding to the point with coordinates (X, Y) in the square plane III' based on n and m;

$$\text{latitude}=90°-(90°-Z_2) \times m \div (W_{III} \div 2)$$ (Equation 9)

$$\text{longitude}=n \div (8 \times m) \times 360° - 180°$$ (Equation 10)

Fourth Step: as shown in FIG. 1(b) and FIG. 1(c), first, spitting the rectangular plane II' into four small planes with a resolution of $H_{II} \times H_{II}$, respectively denoted as: $II_1'$, $II_2'$, $II_3'$, and $II_4'$; then, splicing them into a plane with a resolution of $6W_I \times W_I$ according to the order of plane $II_1'$, plane $II_2'$, plane $II_3'$, plane III', plane $II_4'$, and plane I'; during the splicing process, the plane III' rotates clockwise by 90°, and the plane $II_4'$ rotates counterclockwise by 90°.

Figure 2:
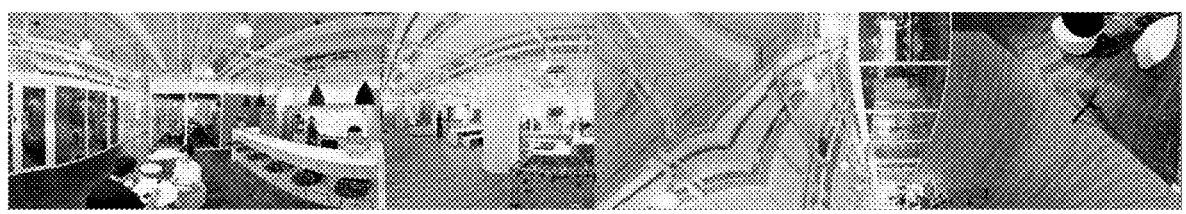
FIG. 2 is an effective diagram of mapping a panoramic image into a plane image according to the embodiments of the present disclosure.

Till now, this embodiment implements mapping a panoramic image from a spherical surface into a planar image. The rendering effect of the obtained plane image is shown in FIG. 2.

In another aspect, the panoramic image reversely mapping method according to the present disclosure refers to mapping a two-dimensional plane image B back to a spherical surface, wherein the two-dimensional plane image B is spliced by three planes, which are denoted as plane I', plane II', and plane III', respectively, wherein the plane I' is a square plane with a resolution of $W_I \times W_I$, the plane II' is a rectangular plane with a resolution of $W_{II} \times H_{II}$, and the plane III' is a square plane with a resolution of $W_{III} \times W_{III}$; the panoramic video reversely mapping method refers to mapping a plane I' back to Area I on the spherical surface with a latitude of $-90° \sim Z_1$, mapping the plane II' back to Area II on the spherical surface with a latitude of $Z_1 \sim Z_2$, and mapping the plane III' back to Area III on the spherical surface with a latitude of $Z_2 \sim 90°$, wherein the values of parameter $Z_1$, $Z_2$, $W_I$, $W_{II}$, $H_{II}$, $W_{III}$ is obtained from a bit stream, but not limited thereto. In this embodiment, let parameter $W_I=0.25 \times W_{II}=H_{II}=W_{III}$, and the two-dimensional plane image B spliced by the plane I', the plane II', and the plane III' has a resolution of $6W_I \times W_I$.

Specific steps of mapping the two-dimensional plane image B back to the spherical surface using the panoramic video reversely mapping method include:

First Step: splitting the two-dimensional image B into plane I, plane II', and plane III', specifically: splitting the two-dimensional plane image B into $6W_I \times W_I$ planes, denoted as plane 1, plane 2, plane 3, plane 4, plane 5, and plane 6, respectively; rotating the plane 4 counterclockwise by 90° to obtain the plane III'; the plane 6 is the plane I'; the remained 6 planes are spliced into a plane with a resolution of $4W_I \times W_I$ in the order of plane 1, plane 2, plane 3, and plane 5 (wherein the plane 5 rotates clockwise by 90°) to obtain the plane II';

Step 2): for all pixels in the area on the spherical surface with a latitude of $-90° \sim Z_1$, computing its corresponding coordinates (X, Y) in the plane I' based on the spherical coordinates Coordinate (longitudes and latitudes), and taking the pixel value at (X, Y) in the plane I' (or interpolating a surrounding pixel) as the value of the pixel point on the spherical surface at the coordinates Coordinate. The step of computing its corresponding coordinates (X, Y) in the plane I' based on the spherical coordinates Coordinate is provided below:

2.1) computing, based on the latitude latitude, the distance m from the point in the plane I' corresponding to the point on the spherical surface to the center of the plane I', wherein the computation equation is provided below:

$$m=(W_I \div 2) \times (\text{latitude}+90°) \div (Z_1+90°)$$ (Equation 11)

2.2) computing, based on the longitude longitude, the distance n from the point in the plane I' corresponding to the point on the spherical surface to the $0^{th}$ point in the concentric square where the corresponding point is located, wherein the computation equation is provided below:

$$n=8 \times m \times (\text{longitude}+180) \div 360°$$ (Equation 12)

2.3) computing, based on the values of m and n, the coordinates (X, Y) of the point in the plane I' corresponding to the point on the spherical surface.

$$\begin{cases} X = n + m2 - 0.5; Y = W_I \div 2 - m - 0.5 & (n < 2 \times m) \\ X = W_I \div 2 + m - 0.5; Y = n + m2 - 2 \times m - 0.5 & (2 \times m \leq n < 4 \times m) \\ X = 4 \times m - n - m2 + W_I - 0.5; \\ \quad Y = W_I \div 2 + m - 0.5 & (4 \times m \leq n < 6 \times m) \\ X = W_I \div 2 - m - 0.5; \\ Y = 6 \times m - n - m2 + W_I - 0.5 & (6 \times m \leq n \leq 8 \times m) \end{cases}$$ (Equation 13)

where $m2=(W_I-1) \div 2 - m$.

Third Step: for all pixels in the area on the spherical surface with a latitude of $Z_1 \sim Z_2$, computing its corresponding coordinates (X, Y) in the plane II' based on the spherical coordinates Coordinate (longitudes and latitudes), and taking the pixel value at (X, Y) in the plane II' (or interpolating a surrounding pixel) as the value of the pixel point on the spherical surface at the coordinates Coordinate. The equation of computing its corresponding coordinates (X, Y) in the plane II' based on the spherical coordinates Coordinate is provided below:

$$Y=(Z_2-\text{latitude}) \times H_{II} \div (Z_2-Z_1)-0.5$$ (Equation 14)

$$X=(\text{longitude}+180°-\text{offset}) \div 360° \times W_{II}-0.5$$ (Equation 15)

where offset is the longitude corresponding to the center of the rectangular plane II'.

Fourth Step: for all pixels in the area on the spherical surface with a latitude of $Z_2 \sim 90°$, computing its corresponding coordinates (X, Y) in the plane III' based on the spherical coordinates Coordinate (longitudes and latitudes), and taking the pixel value at (X, Y) in the plane III' (or interpolating a surrounding pixel) as the value of the pixel point on the spherical surface at the coordinates Coordinate.

4.1) computing, based on the latitude latitude, the distance m from the point in the plane III' corresponding to the point on the spherical surface to the center of the plane III';

$$m=(W_{III} \div 2) \times (90°-\text{latitude}) \div (90°-Z_2)$$ (Equation 16)

4.2) computing, based on the longitude longitude, the distance n from the point in the plane III' corresponding to the point on the spherical surface to the nth point in the concentric square where the corresponding point is located;

$$n=8 \times m \times (\text{longitude}+180°) \div 360°$$ (Equation 17)

4.3) computing, based on the values of m and n, the coordinates (X, Y) of the point in the plane III' corresponding to the point on the spherical surface.

$$m2 = (W_{III} - 1) \div 2 - m \qquad \text{(Equation 18)}$$

$$\begin{cases} Y = n + m2 - 0.5; X = W_{III} \div 2 - m - 0.5 & (n < 2 \times m) \\ Y = W_{III} \div 2 + m - 0.5; \\ X = n + m2 - 2 \times m - 0.5 & (2 \times m \leq n < 4 \times m) \\ Y = 4 \times m - n - m2 + W_{III} - 0.5; \\ X = W_{III} \div 2 + m - 0.5 & (4 \times m \leq n < 6 \times m) \\ Y = W_{III} \div 2 - m - 0.5; \\ X = 6 \times m - n - m2 + W_{III} - 0.5 & (6 \times m \leq n \leq 8 \times m) \end{cases}$$

where $m2=(W_{III}-1) \div 2-m$.

Till now, all steps of the reversely mapping method according to the present disclosure are completed. By mapping the two-dimensional plane image B back to the spherical surface using the reversely mapping method, it facilitates rendering and viewing.

In specific implementations, a spherical panoramic video is mapped into a plane view screen of a same size (i.e., having the same number of pixels) by using equirectangular, PLANE_POLES, and the present disclosure and encoded. In particular, the PLANE_POLES mapping method is to mapping the areas nearby the two poles on the spherical surface into square shapes, and mapping rings with the same latitude on the spherical surface into rings on the plane. The experimental results indicated that, compared with equirectangular mapping, the method according to the present disclosure achieves an improvement of over 10% coding efficiency; compared with the PLANE_POLEs method, the coding efficiency is enhanced by 3%~4%.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. A panoramic image mapping method to map a spherical surface corresponding to panoramic image or video A into a two-dimensional plane image or video B, mapping formats of the panoramic image or video A include, multi-channel camera acquired panoramic image or video, so as to ameliorate the oversampling of the panoramic image or video in high-latitude areas and reduce the bit rate required for coding the panoramic image and video; comprising: first, dividing the spherical surface into three areas based on the latitudes of the spherical surface, denoted as Area I, Area II, and Area III, respectively; mapping the three areas to a square plane I', a rectangular plane II', and a square plane III', respectively; then, splicing the planes I', II' and III' into a plane, wherein the resulting plane is the two-dimensional image or video B;

wherein Area I corresponds to the area with a latitude of $-90°\sim Z_1$ on the spherical surface, Area II corresponds to the area with a latitude of $Z_1\sim Z_2$ on the spherical surface, and Area III corresponds to the area with a latitude of $Z_2\sim 90°$ on the spherical surface; the values of the parameters $Z_1$, $Z_2$ are autonomously set and satisfy the condition: $-90°\leq Z_1\leq Z_2\leq 90°$;

the square plane I' has a resolution of $W_I \times W_I$, the rectangular plane II' has a resolution of $W_{II} \times H_{II}$, and the square plane III' has a resolution of $W_{III} \times W_{III}$; the values of the parameters $W_I$, $W_{II}$, $H_{II}$, $W_{III}$ are autonomously set;

the mapping method comprises steps of:

1) for each pixel point in the square plane I', computing its corresponding spherical coordinates (longitudes and latitudes) based on its coordinates (X, Y) in the plane I'; then, taking the pixel value at a corresponding position on the spherical surface (or obtaining a corresponding pixel value of a surrounding pixel by interpolation) as the pixel value of the pixel point (X, Y) in the plane I', wherein the computing the corresponding spherical coordinates Coordinate based on the coordinates (X, Y) of the pixel point in the plane I' comprises steps of:

1.1) computing the vertical distance and the horizontal distance from the point to the square plane I', and taking the larger one, denoted as m;

1.2) the square plane I' may comprise a plurality of concentric squares; in this step, the distance from the point to the $0^{th}$ point on the concentric square where the point is located, denoted as n; wherein the position of the $n^{th}$ point may be randomly selected; computing the distance from the pixel point to the $n^{th}$ point on the concentric square where the pixel point is located in the clockwise or counterclockwise manner;

1.3) computing the latitude and the longitude corresponding to the point with coordinates (X, Y) in the square plane I' based on n and m, obtaining the corresponding coordinates Coordinate on the spherical surface;

2) for each pixel point in the rectangular plane II', computing its corresponding spherical coordinates, including longitudes and latitudes based on its coordinates (X, Y) in the plane II'; then, taking the pixel value at a corresponding position on the spherical surface, or obtaining a corresponding pixel value of a surrounding pixel by interpolation, as the pixel value of the pixel point (X, Y) in the plane II';

3) for each pixel point in the square plane III', computing its corresponding spherical coordinates, including longitudes and latitudes,) based on its coordinates (X, Y) in the plane III'; then, taking the pixel value at a corresponding position on the spherical surface (or obtaining a corresponding pixel value of a surrounding pixel by interpolation) as the pixel value of the pixel point (X, Y) in the plane I', wherein the computing the corresponding spherical coordinates Coordinate based on the coordinates (X, Y) of the pixel point in the plane III' comprises steps of:

3.1) computing the vertical distance and the horizontal distance from the point to the square plane III', and taking the larger one, denoted as m;

3.2) the square plane III' may comprise a plurality of concentric squares; the distance from the point to the $0^{th}$ point on the concentric square where the point is located, denoted as n; wherein the position of the $n^{th}$ point may be randomly selected;

3.3) computing the latitude and the longitude corresponding to the point with coordinates (X, Y) in the square plane III' based on n and m;

4) splicing the planes I', II', and III' into a plane based on the value of $W_I$, $W_{II}$, $H_{11}$, $W_{III}$.

2. The mapping method according to claim 1, wherein step 1.1). Equation 1 is used for the computing to obtain:

$$m = \max(\text{abs}(W_I \div 2 - X - 0.5), \text{abs}(W_I \div 2 - Y - 0.5)) \quad \text{(Equation 1)}$$

m is the larger one of the vertical distance and the horizontal distance from the point to the square plane I';
Equation 2 is used for the computing in step 1.2):

$$n = \begin{cases} X + 0.5 - m2 & (Y \leq X \text{ and } X + Y < W_{III}) \\ 2 \times m + Y + 0.5 - m2 & (Y < X \text{ and } X + Y \geq W_{III}) \\ 4 \times m + W_{III} - (X + 0.5) - m2 & (Y \geq X \text{ and } X + Y > W_{III}) \\ 6 \times m + W_{III} - (Y + 0.5) - m2 & (Y > X \text{ and } X + Y \leq W_{III}) \end{cases} \quad \text{(equation 2)}$$

where $m2=(W_I-1) \div 2 - m$; n denotes the distance from the pixel point to the nth zero on the concentric square where the pixel point is located;
In step 1.3), Equations 3 and 4 are used for the computing:

$$\text{latitude} = (Z_1 + 90°) \times m \div (W_I \div 2) - 90° \quad \text{(Equation 3)}$$

$$\text{longitude} = n \div (8 \times m) \times 360° - 180° \quad \text{(Equation 4)}$$

where latitude refers to the latitude corresponding to the point with the coordinates (X, Y) in the square plane I'; and longitude denotes the corresponding longitude.

3. The mapping method according to claim 1, wherein the equations in step 2) of computing the corresponding spherical surface Coordinate based on the coordinates (X, Y) in the plane II' is:

$$\text{latitude} = Z_2 - (Z_2 - Z_1) \times (Y + 0.5) \div H_{II} \quad \text{(Equation 5)}$$

$$\text{longitude} = 360° \times (X + 0.5) \div W_{II} - 180° + \text{offset} \quad \text{(Equation 6)}$$

where offset denotes the longitude corresponding to the center of the rectangular plane II', which may be autonomously set.

4. The mapping method according to claim 1, wherein step 3.1). Equation 7 is used for the computing to obtain:

$$m = \max(\text{abs}(W_{III} \div 2 - X - 0.5), \text{abs}(W_{III} \div 2 - Y - 0.5)) \quad \text{(Equation 7)}$$

m is the larger one of the vertical distance and the horizontal distance from the point to the square plane III';
Equation 8 is used for the computing in step 3.2):

$$n = \begin{cases} Y + 0.5 - m2 & (Y \geq X \text{ and } X + Y < W_{III}) \\ 2 \times m + X + 0.5 - m2 & (Y > X \text{ and } X + Y \geq W_{III}) \\ 4 \times m + W_{III} - (Y + 0.5) - m2 & (Y \leq X \text{ and } X + Y > W_{III}) \\ 6 \times m + W_{III} - (X + 0.5) - m2 & (Y < X \text{ and } X + Y \leq W_{III}) \end{cases} \quad \text{(equation 8)}$$

where $m2=(W_{III}-1) \div 2 - m$; n denotes the distance from the pixel point to the nth zero on the concentric square where the pixel point is located;
In step 3.3), Equations 9 and 10 are used for the computing:

$$\text{latitude} = 90° - (90° - Z_2) \times m \div (W_{III} \div 2) \quad \text{(Equation 9)}$$

$$\text{longitude} = n \div (8 \times m) \times 360° - 180° \quad \text{(Equation 10)}$$

where latitude refers to the latitude corresponding to the point with the coordinates (X, Y) in the square plane III'; and longitude denotes the corresponding longitude.

5. The mapping method according to claim 1, wherein the step 4) of splicing the planes I', II', III' into a plane based on the value of parameter $W_I$, $W_{II}$, $H_{II}$, $W_{III}$ specifically comprises: when $W_I = 0.25 \times W_{II} = H_{II} = W_{III}$, first splitting the rectangular plane II' into four small planes with a resolution of $H_{II} \times H_{II}$, denoted as: $II_1'$, $II_2'$, $II_3'$, and $II_4'$; then, splicing the six planes according to the order of plane $II_1'$, plane $II_2'$, plane $II_3'$, plane III', plane $II_4'$, and plane I'; during the splicing process, the plane III' rotates clockwise by 90°, and the plane $II_4'$ rotates counterclockwise by 90°, thereby obtaining a plane with a resolution of $6W_I \times W_I$.

6. A panoramic image reversely mapping method, which maps a two-dimensional plane image or video B back to a spherical surface to obtain a panoramic image or video A; mapping formats of the panoramic image or video A include, multi-channel camera acquired panoramic image or video, so as to ameliorate the oversampling of the panoramic image or video in high-latitude areas and reduce the bit rate required for coding the panoramic image and video; wherein the two-dimensional plane image or video B is spliced by three planes, which are denoted as plane I', plane II', and plane III', respectively, wherein the plane I' is a square plane with a resolution of $W_I \times W_I$, the plane II' is a rectangular plane with a resolution of $W_{II} \times H_{II}$, and the plane III' is a square plane with a resolution of $W_{III} \times W_{III}$; the panoramic video reversely mapping method refers to mapping a plane I' back to Area I on the spherical surface with a latitude of $-90° \sim Z_1$, mapping the plane II' back to Area II on the spherical surface with a latitude of $Z_1 \sim Z_2$, and mapping the plane III' back to Area III on the spherical surface with a latitude of $Z_2 \sim 90°$, wherein the values of parameters $Z_1$, $Z_2$, $W_I$, $W_{II}$, $H_{II}$, $W_{III}$ are obtained from a bit stream, but not limited thereto; the reversely mapping method includes steps of:

1) splitting the two-dimensional image B into plane I', plane II', and plane III';
2) for each pixel point in the area on the spherical surface with a latitude of $-90° \sim Z_1$, computing its corresponding coordinates (X, Y) in the plane I' based on the spherical coordinates Coordinate, i.e., longitudes and latitudes, and taking the pixel value at (X, Y) in the plane I', or interpolating a surrounding pixel, as the value of the pixel point on the spherical surface at the coordinates Coordinate;
3) for each pixel point in the area on the spherical surface with a latitude of $Z_1 \sim Z_2$, computing its corresponding coordinates (X, Y) in the plane II' based on the spherical coordinates Coordinate, and taking the pixel value at (X, Y) in the plane II', or interpolating a surrounding pixel, as the value of the pixel point on the spherical surface at the coordinates Coordinate;
4) for each pixel point in the area on the spherical surface with a latitude of $Z_2 \sim 90°$, computing its corresponding coordinates (X, Y) in the plane III' based on the spherical coordinates Coordinate, and taking the pixel value at (X, Y) in the plane III', or interpolating a surrounding pixel, as the value of the pixel point on the spherical surface at the coordinates Coordinate;
thereby implementing mapping the two-dimensional plane image or video B back to the spherical surface to obtain the panorama image or video A.

7. The reversely mapping method according to claim 6, wherein in step 1), in the case of the parameter $W_I = 0.25 \times W_{II} = H_{II} = W_{III}$, and when the two-dimensional plane image B spliced by the plane I', the plane II', and the plane III' has a resolution of $6W_I \times W_I$, the two-dimensional plane image B is split into 6 $W_I \times W_I$ planes, denoted as plane 1, plane 2, plane 3, plane 4, plane 5, and plane 4; rotating the plane 4 counterclockwise by 90° to obtain the plane III'; the plane 6 is the plane I'; the remained 4 planes are spliced in the order of plane 1, plane 2, plane 3, and plane 5 in to a plane with a resolution of $4W_I \times W_I$ (wherein the plane 5 is rotated clockwise by 90°) to obtain the plane II'.

8. The reversely mapping method according to claim 6, wherein the step 2) of computing, for each pixel point in the area with a latitude of $-90° \sim Z_1$ on the spherical surface, its corresponding coordinates (X, Y) in the plane I' based on the spherical coordinates Coordinate of the pixel point includes:

2.1) computing, based on the latitude, the distance m from the point in the plane I' corresponding to the point on the spherical surface to the center of the plane I';

2.2) computing, based on the longitude, the distance n from the point in the plane I' corresponding to the point on the spherical surface to the nth point in the concentric square where the corresponding point is located;

2.3) computing, based on the values of m and n, the coordinates (X, Y) of the point in the plane I' corresponding to the point on the spherical surface.

9. The reversely mapping method according to claim 8, wherein equation 11 is used in step 2.1) of computing, based on the latitude latitude, the distance m from the point in the plane I' corresponding to the point on the spherical surface to the center of the plane I';

$$m = (W_I \div 2) \times (\text{latitude} + 90°) \div (Z_1 + 90°) \quad \text{(Equation 11)}$$

where latitude denotes the latitude of the point on the spherical surface;

Equation 12 is used in step 2.2) of computing, based on the longitude, the distance n from the point in the plane I' corresponding to the point on the spherical surface to the nth point in the concentric square where the corresponding point is located:

$$n = 8 \times m \times (\text{longitude} + 180°) \div 360° \quad \text{(Equation 12)}$$

where longitude denotes the latitude of the point on the spherical surface;

Equation 13 is used in step 2.3) of computing, based on the values of m and n, the coordinates (X, Y) of the point in the plane I' corresponding to the point on the spherical surface:

$$\begin{cases} X = n + m2 - 0.5;\ Y = W_I \div 2 - m - 0.5 & (n < 2 \times m) \\ X = W_I \div 2 + m - 0.5;\ Y = n + m2 - 2 \times m - 0.5 & (2 \times m \leq n < 4 \times m) \\ X = 4 \times m - n - m2 + W_I - 0.5; \\ \quad Y = W_I \div 2 + m - 0.5 & (4 \times m \leq n < 6 \times m) \\ X = W_I \div 2 - m - 0.5; \\ \quad Y = 6 \times m - n - m2 + W_I - 0.5 & (6 \times m \leq n \leq 8 \times m) \end{cases} \quad \text{(Equation 13)}$$

where $m2 = (W_I - 1) \div 2 - m$.

10. The reversely mapping method according to claim 6, wherein equations 14 and 15 are adopted in the step 3) of computing, for each pixel point in the area with a latitude of $Z_1 \sim Z_2$ on the spherical surface, its corresponding coordinates (X, Y) in the plane II' based on the spherical coordinates Coordinate of the pixel point:

$$Y = (Z_2 - \text{latitude}) \times H_{II} \div (Z_2 - Z_1) - 0.5 \quad \text{(Equation 14)}$$

$$X = (\text{longitude} + 180° - \text{offset}) \div 360° \times W_{II} - 0.5 \quad \text{(Equation 15)}$$

Where latitude and longitude denote the latitude and longitude of the point on the spherical surface, respectively; and offset denotes the longitude corresponding to the center of the rectangular plane II'.

11. The reversely mapping method according to claim 6, wherein the step 4) of for each pixel point in the area on the spherical surface with a latitude of $Z_2 \sim 90°$, computing its corresponding coordinates (X, Y) in the plane III' based on the spherical coordinates Coordinate, and taking the pixel value at (X, Y) in the plane III', or interpolating a surrounding pixel, as the value of the pixel point on the spherical surface at the coordinates Coordinate, comprises steps of:

4.1) computing, based on the latitude, the distance m from the point in the plane III' corresponding to the point on the spherical surface to the center of the plane III';

4.2) computing, based on the longitude, the distance n from the point in the plane III' corresponding to the point on the spherical surface to the nth point in the concentric square where the corresponding point is located;

4.3) computing, based on the values of m and n, the coordinates (X, Y) of the point in the plane III' corresponding to the point on the spherical surface.

12. The reversely mapping method according to claim 11, wherein equation 16 is used in step 4.1) of computing, based on the latitude, the distance m from the point in the plane III' corresponding to the point on the spherical surface to the center of the plane III';

$$m = (W_{III} \div 2) \times (90° - \text{latitude}) \div (90° - Z_2) \quad \text{(Equation 16)}$$

where latitude denotes the latitude of the point on the spherical surface;

Equation 17 is used in step 4.2) of computing, based on the longitude, the distance n from the point in the plane III' corresponding to the point on the spherical surface to the $n^{th}$ point in the concentric square where the corresponding point is located:

$$n = 8 \times m \times (\text{longitude} + 180°) \div 360° \quad \text{(Equation 17)}$$

where longitude denotes the latitude of the point on the spherical surface;

Equation 18 is used in step 4.3) of computing, based on the values of m and n, the coordinates (X, Y) of the point in the plane III' corresponding to the point on the spherical surface:

$$m2 = (W_{III} - 1) \div 2 - m \quad \text{(Equation 18)}$$

$$\begin{cases} Y = n + m2 - 0.5;\ X = W_{III} \div 2 - m - 0.5 & (n < 2 \times m) \\ Y = W_{III} \div 2 + m - 0.5; \\ \quad X = n + m2 - 2 \times m - 0.5 & (2 \times m \leq n < 4 \times m) \\ Y = 4 \times m - n - m2 + W_{III} - 0.5; \\ \quad X = W_{III} \div 2 + m - 0.5 & (4 \times m \leq n < 6 \times m) \\ Y = W_{III} \div 2 - m - 0.5; \\ \quad X = 6 \times m - n - m2 + W_{III} - 0.5 & (6 \times m \leq n \leq 8 \times m) \end{cases}$$

where $m2 = (W_{III} - 1) \div 2 - m$.

* * * * *